United States Patent
Kamp et al.

(10) Patent No.: US 10,939,353 B2
(45) Date of Patent: Mar. 2, 2021

(54) RELIABLE REPORTING IN WIRELESS MESH NETWORK

(71) Applicant: SIGNIFY HOLDING B.V., Eindhoven (NL)

(72) Inventors: Antonie Leonardus Johannes Kamp, Eindhoven (NL); Niels Van Tetrode, Eindhoven (NL); Daniel Martin Görgen, Eindhoven (NL); Leendert Teunis Rozendaal, Eindhoven (NL); Martinus Wilhelmus Blüm, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/321,128

(22) PCT Filed: Jul. 20, 2017

(86) PCT No.: PCT/EP2017/068311
§ 371 (c)(1),
(2) Date: Jan. 28, 2019

(87) PCT Pub. No.: WO2018/024489
PCT Pub. Date: Feb. 8, 2018

(65) Prior Publication Data
US 2019/0174389 A1  Jun. 6, 2019

(30) Foreign Application Priority Data

Aug. 2, 2016 (EP) .................................... 16182398
Aug. 29, 2016 (EP) .................................... 16186068

(51) Int. Cl.
*H04W 40/10* (2009.01)
*H04B 17/318* (2015.01)
(Continued)

(52) U.S. Cl.
CPC .......... *H04W 40/10* (2013.01); *H04B 17/318* (2015.01); *H04L 1/08* (2013.01); *H04L 5/0055* (2013.01); *H04W 84/18* (2013.01)

(58) Field of Classification Search
None
See application file for complete search history.

(56) References Cited

U.S. PATENT DOCUMENTS

2009/0147699 A1* 6/2009 Ruy .................. H04L 29/12254
370/254
2009/0252127 A1* 10/2009 Rangarajan ........... H04W 16/10
370/338

(Continued)

FOREIGN PATENT DOCUMENTS

| JP | 2003284114 A | 10/2003 |
| JP | 2007235895 A | 9/2007 |
| WO | WO2009057863 A1 | 5/2009 |

OTHER PUBLICATIONS

Ryoichi Kawahara, et al., "QoS Overlay Routing Algorithm with Limited Number of Alternative Route Candidates and its Evaluation", Jul. 1, 2011, pp. 231-236.

*Primary Examiner* — Chi H Pham
*Assistant Examiner* — Vladislav Y Agureyev

(57) ABSTRACT

In a wireless mesh network, a battery operated node can select a parent node via which messages are routed to further nodes. The parent node can initially be selected based on signal strength. The node receives acknowledgements for messages sent, if they arrive. The node calculates a reliability indicator of the parent node based on the number of messages for which an acknowledgement has been received. If the reliability indicator exceeds a predetermined threshold the node selects a new parent node, based on second selection criteria. For example, the node with the next greatest signal strength.

10 Claims, 3 Drawing Sheets

(51) Int. Cl.
*H04L 1/08* (2006.01)
*H04L 5/00* (2006.01)
*H04W 84/18* (2009.01)

(56) References Cited

U.S. PATENT DOCUMENTS

| | | | |
|---|---|---|---|
| 2011/0063999 A1* | 3/2011 | Erdmann | H04W 84/18 370/254 |
| 2011/0125917 A1* | 5/2011 | Kim | H04L 12/18 709/231 |
| 2012/0082065 A1* | 4/2012 | Yanagihara | H04W 84/18 370/256 |
| 2012/0155276 A1* | 6/2012 | Vasseur | H04L 45/04 370/237 |
| 2012/0155284 A1* | 6/2012 | Shaffer | H04W 72/0446 370/242 |
| 2012/0166848 A1* | 6/2012 | Broad | G08B 25/009 713/323 |
| 2012/0221678 A1* | 8/2012 | Tanaka | H04L 1/1835 709/217 |
| 2012/0230222 A1* | 9/2012 | Shaffer | H04L 45/48 370/254 |
| 2012/0230370 A1* | 9/2012 | Shaffer | H04B 1/713 375/133 |
| 2012/0233326 A1* | 9/2012 | Shaffer | H04W 40/023 709/225 |
| 2014/0078947 A1* | 3/2014 | Kim | H04W 52/0209 370/311 |
| 2014/0126423 A1* | 5/2014 | Vasseur | H04L 45/48 370/255 |
| 2014/0369212 A1* | 12/2014 | Raravi | H04W 24/10 370/252 |
| 2015/0208320 A1* | 7/2015 | Alexander | H04W 48/12 370/254 |
| 2016/0007273 A1* | 1/2016 | Farid | H04W 48/16 370/329 |
| 2016/0182306 A1* | 6/2016 | Liu | H04W 84/18 370/255 |
| 2016/0330107 A1* | 11/2016 | Thubert | H04L 45/22 |
| 2017/0099218 A1* | 4/2017 | Holcombe | H04L 45/123 |
| 2017/0156144 A1* | 6/2017 | Shudark | H04W 4/80 |
| 2017/0244471 A1* | 8/2017 | Nagakubo | H04W 40/005 |
| 2017/0257274 A1* | 9/2017 | Ahart | H04W 4/50 |
| 2017/0264532 A1* | 9/2017 | Guo | H04W 40/04 |
| 2018/0191478 A1* | 7/2018 | Uhling | H04L 1/1621 |
| 2019/0289453 A1* | 9/2019 | Jang | H04L 47/17 |

* cited by examiner

RELIABLE REPORTING IN WIRELESS MESH NETWORK

CROSS-REFERENCE TO PRIOR APPLICATIONS

This application is the U.S. National Phase application under 35 U.S.C. § 371 of International Application No. PCT/EP2017/068311, filed on Jul. 20, 2017, which claims the benefit of European Patent Applications Nos. 16186068.9, filed on Aug. 29, 2016, and 16182398.4, filed on Aug. 2, 2016. These applications are hereby incorporated by reference herein.

FIELD OF THE INVENTION

The invention generally relates to a method for enhancing the reliability of reporting from a node, via a parent node, to a further node in a wireless mesh network. The invention further relates to such a node implementing the method and to a computer program product for performing the method.

BACKGROUND OF THE INVENTION

U.S. Pat. No. 8,275,313 B1 discloses a node, in a network, selecting a parent node based on a combination of a number of hops to a common destination, a received signal strength, a number of associated child nodes, and a remaining battery power of the potential parent node.

WO 2009/057863 A1 discloses a node, in a network, selecting a parent node based on the residual energy information of each of the neighboring sensor nodes.

In a wireless mesh network nodes cooperate in the distribution of data. In systems designed for, for example, smart homes such wireless mesh networks can be used to operate at a higher reliability compared to traditional wireless networks.

Nodes in a wireless mesh network can operate as an end node (non routing node) or a routing node. As an example, in a wireless mesh network based lighting system, a lighting device could operate as a routing node as it is continuously powered and available for routing messages. However, a battery operated wall switch in the same network operating as a routing node would deplete the battery too quickly. Therefore, such a battery operated wall switch will typically operate as an end node and will communicate in the wireless mesh network via a parent node (one of the routing nodes). It will then receive and send messages via the parent node. This parent node will receive and store messages destined for this end node from further nodes, allowing the end node to periodically poll its parent node to check for such messages. Likewise, the end node can send a message destined for a further node via its parent node. One benefit of such an approach is limiting power consumption of the end node communicating via the parent node.

In wireless mesh networks, such as a ZigBee network, selection of the parent node by the end node is performed e.g. based on signal strength. The parent node acts on behalf of the end node for the routing of the messages received from and/or destined for the end node. For end nodes that perform reporting, this is potentially a suboptimal solution as the most optimal route may not be used, and there is no guarantee that important reports will actually get delivered to the further node. There is a need for enhancing the reliability of reporting from such end nodes.

SUMMARY OF THE INVENTION

It is an object to provide a method and device for controlling a node in a wireless mesh network, as well as a computer program product for executing the method, which enhance the reliability of message transmission from a node to a further node, the node having a parent node. The phrase 'parent node' should be interpreted broadly and covers any type of routing node fit for the purpose of relaying a message.

In a first aspect, a method of controlling a node in a wireless mesh network is provided. The method comprises the node selecting a parent node, via which messages are sent to a further node and based on acknowledgements received calculating a reliability indicator. When the reliability indicator reaches a threshold, the node selects a new parent node. This is beneficial as when the parent node is unreliable (or more specifically, transmission from the end node via the parent node to the further node is unreliable), a new parent node is selected to mitigate the impact of an unreliable parent node on the message flow from the node to the further node.

The selecting of a parent node, through which the node will communicate with one or more further nodes in the wireless mesh network, is based on first selection criteria. As an example, the first selection criteria can be signal strength of the signal received from the parent node as measured by the node. The method further comprises the node sending one or more messages destined for at least one of the one or more further nodes in the wireless mesh network via the parent node. The parent node will thus receive a message from the node and pass this message on, e.g. via other nodes in the wireless mesh network, to the further node which the message is destined for. Acknowledgements are received for all, certain or some messages from the further node when the message has arrived. The acknowledgement can be explicitly requested in the message sent to the further node or the wireless mesh network can be configured to send acknowledgements by default; e.g. for all messages, certain message types, every N minutes and/or every N-th message.

Calculating the reliability indicator of the parent node is performed by the node through polling the parent node to determine the number of messages for which an acknowledgement has been received from the further node(s) the messages were destined for. Typically, the node will receive the acknowledgement messages from the parent node and perform the relevant calculations. The ratio of messages expected, e.g. based on the number of messages sent, versus the number of acknowledgements received is an example of such a reliability indicator. When an acknowledgement is expected for each message sent and after ten messages only three acknowledgements have been received, a reliability indicator of e.g. 30%, low or <50% can be determined. As further examples, the total number of missing acknowledgements, the number of acknowledgements missing sequentially, etc. can be the basis for calculating the reliability indicator.

The method concludes in the node selecting a new parent node, based on second selection criteria. This is performed only when the reliability indicator exceeds a predetermined threshold (e.g. is lower than, greater than or reaches a specific number such as 'for 90% or less of the messages for which an acknowledgement is expected, an acknowledgement is received' or 'three acknowledgements in a row are missing'). Thus, as long as reliability of the parent node is sufficient, the node makes use of the parent node. When the reliability indicator is indicative of a parent node being unreliable, the node searches for another node to act as parent node. As an example, the second selection criteria can be the same as the first selection criteria, yet excluding the unreliable parent node from the nodes to select from. The routing node with the second strongest signal strength would then be selected as new parent node.

In an embodiment of the method according to the first aspect, the step of the node selecting a new parent node is conditional. The conditionality is based on one or more of: the time passed since the last selection of a new parent node (e.g. at least 10 minutes), the number of times a new parent node has been selected in a predetermined time period (e.g. no more than three times a day), and the number of nodes capable of functioning as a parent node from which a new parent node can be selected (e.g. not selecting a new parent node if there is only one node to select from). This is advantageous as it prevents the node from repeatedly selecting a new parent node, thereby increasing power consumption of the node as the process of searching and selecting a parent node can impose a considerable power consumption.

In another embodiment of the method according to the first aspect, the node is a sensor node sending messages destined for a collector node. In a lighting system, for example, presence sensors, ambient light level sensors and other sensors are to report their sensor readings to a collector node which can further process the received sensor readings. The collector node can pass collected sensor readings on to, for example, a building management system or visualize information extracted from the received data for a user such as via a user interface (e.g. showing a temperature graph based on temperature sensor readings).

In yet another embodiment of the method according to the first aspect, the method further comprises: the node selecting, based on the reliability indicator, a retransmission strategy for retransmitting a message for which no acknowledgement has been received. As an example, the retransmission strategy comprises resending messages of a first type (messages triggered by a single event and/or a periodic update) and not resending messages of a second type (burst event). Examples of a single event are: a sensor detecting presence, a user pressing a switch, etc. Examples of a periodic update are: a sensor reporting an ambient light level, a sensor reporting a continued presence, etc. Examples of a burst event are: a user controlling a dimmer (each part of a rotation can then be a message, thus a single user movement can comprise a burst of messages), a user using a color wheel, etc. Continuing the example, if in a lighting system a user operated a (rotary of other) dimmer, then several messages are sent in a short period of time as the user dims up or down. Resending such messages is not necessarily beneficial, as illustrated in the following two examples. As a first example, if each message comprises a dim up command and the lighting device being controlled dims up based on having received such a command, the user will keep dimming up until the appropriate light level is reached. When a message (e.g. third dim up message) is missing, the next message (fourth message) will in any case be a dim up message as the user has not reached the desired light level and thus keeps dimming up. As a second example, if each message comprises the absolute level the lighting device should dim to, then resending the message can be detrimental to the dim up sequence. A first message dims up to 10%, a second message to 20% and so on until the eight message dimming up to 80% when the user lets go of the dim up button as the desired light level is reached. Suppose the seventh message is not acknowledged, then the node resending this message can cause the lighting device to dim up from 60% to 80% (skipping the missing 70%) and then back to 70% (when the message is resent; since resending can only be done after some timeout to allow for the reception of the acknowledgement, by the time of the resending of the 70% message, the 80% message has already been sent). This causes an undesirable user experience.

Examples of a messages that are to be resent include single events and periodic reporting. A single event can comprise, for example, a user turning on or off a lighting device, a user setting a scene and a presence sensor sending a signal to indicate presence has been detected. If such a message does not reach its destination, the system does not respond as the user expects (e.g. the lighting device does not turn on despite the user pressing the on button or despite the presence sensor having detected presence). Therefore, it is beneficial if such a message is resent if no acknowledgement is received. Periodic reporting can be implemented in a wireless mesh network such that a sensor, e.g. an ambient light level sensor or a temperature sensor, reports every five minutes. The reported information can be used in another system, such as a building management system, or can be displayed in a user interface, such as a wall panel, for the user to see. When a message comprising periodic reporting data is not received, e.g. by a collector node, then the data is not up-to-date. Again it can be beneficial to resend this message. However, as another option a node can be configured to not resend a periodic reporting message if the next report is to occur within a predetermined timeframe (e.g. within one minute).

The retransmission strategy can comprise resending a message as a unicast message via the parent node when no acknowledgement is received, resending it as a broadcast message via the parent node, resending it directly to the further node or another node (either as unicast, broadcast or multicast message), etc. Although a broadcast message uses more network resources, it increases the chance of the message arriving at the e.g. collector node. Circumventing an unreliable parent node is yet another way of resending a message which, in normal operating circumstances may be undesirable, yet which increases the chance of the message reaching its destination when the parent node is unreliable. When the reliability indicator is high and a message is not acknowledged the node can resend as a unicast via the parent, essentially using the same message transmission path as for the message that has not been acknowledged. However, when the reliability indicator is low, the node can select a retransmission strategy that has a greater chance of success compared to using the parent node with the low reliability. Further, the type of message can be taken into account such that a message that is less critical (e.g. a sensor reading that is not indicative of a change since the last report by that sensor), will be sent via a more power conscious retransmission than one that is more critical (e.g. a user pressing an on button to turn on a lighting device or a presence sensor detecting presence).

In a second aspect, a computer program product is provided for performing the method according to the first aspect when run on a computer device. The computer device can be a network node, such as a sensor device.

In a third aspect, a device is provided which is arranged for operating as a node in a wireless mesh network. An example of such a device is a wireless mesh network sensor device. The device comprises an interface and a processor. The interface is arranged for communicating with nodes in the wireless mesh network. The processor is arranged for sending and receiving messages via the interface and is further arranged for selecting a parent node, sending messages via the parent node, calculating a reliability indicator of the parent node and selecting a new parent node when the reliability indicator exceeds a predetermined threshold. The processor selects based on first selection criteria a parent node through which the device will communicate with one or more further nodes in the wireless mesh network. It sends one or more messages destined for at least one of the one or more further nodes in the wireless mesh network via the selected parent node. It calculates a reliability indicator of the parent node by polling the parent node (or otherwise receiving from the parent node) to determine the number of messages for which an acknowledgement has been received from the one or more further nodes said messages were destined for. For example, the node receives the acknowledgements from the parent node and based upon this determine the number of acknowledgements missing. It selects a new parent node, based on second selection criteria, when the reliability indicator exceeds a predetermined threshold.

Although the device can be implemented based on any of the embodiments of the method according to the first aspect, only one embodiment is explicitly reiterated here. In an embodiment of the device according to the third aspect, the processor is further arranged for selecting, based on the reliability indicator, a retransmission strategy for retransmitting a message for which no acknowledgement has been received.

BRIEF DESCRIPTION OF THE DRAWINGS

These and other aspects of the invention will be apparent from and elucidated further with reference to the embodiments described by way of example in the following description and with reference to the accompanying drawings, in which.

DETAILED DESCRIPTION OF EMBODIMENTS

Figure 1:
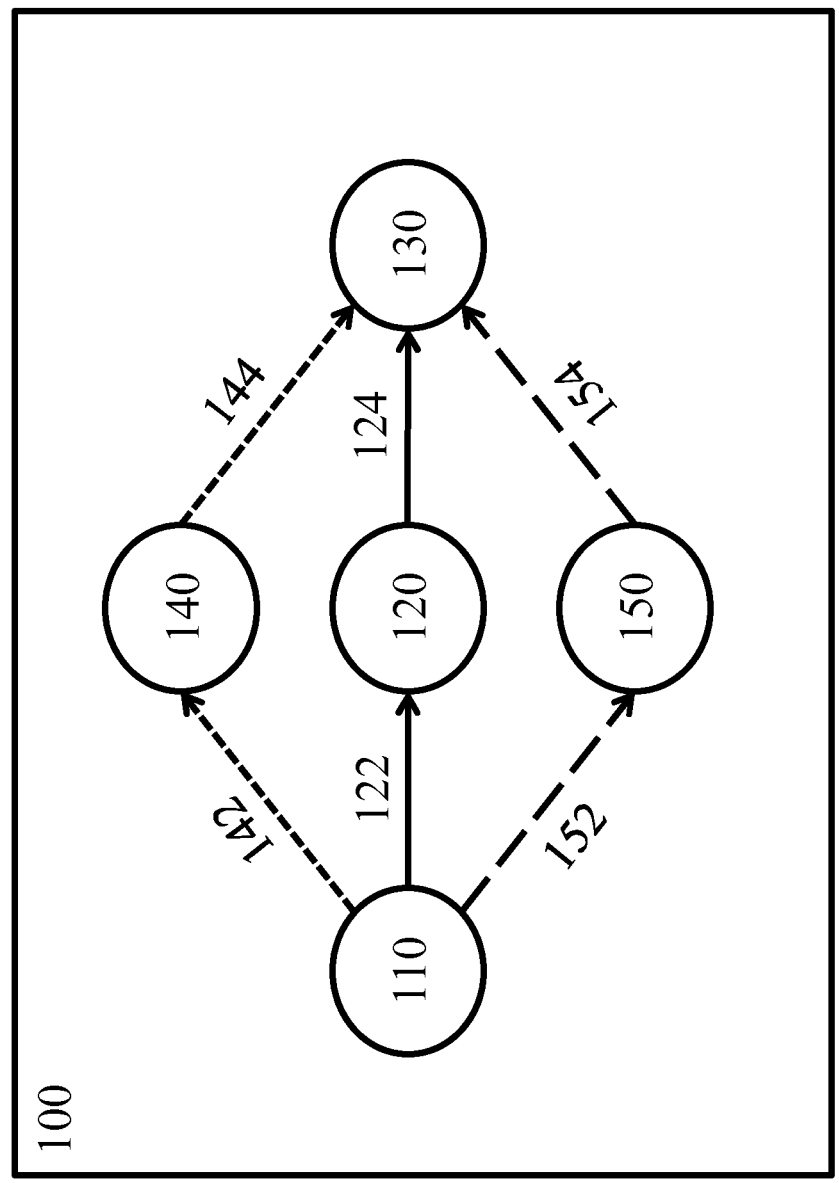
FIG. 1 shows schematically and exemplarily a wireless mesh network.

In FIG. 1 a wireless mesh network 100 is shown. It comprises a node 110, such as a sensor node, which communicates through a parent node 120 with a further node 130, such as a collector node. For example, the node 110 can send sensor data to the further node 130 which collects this data for further processing. The node 110 can, for example, be a battery operated node, an energy harvesting node or a node which for another reason manages its power resources to be power efficient. Using a parent node 120 alleviates the node 110 from having to be available in the wireless mesh network 100 at all times. The node 110 can, for example, turn on its wireless mesh network interface only when it needs to send a message or when it needs to check whether the parent node 120 is holding a message for it and be in a power-saving mode for the remainder of the time.

A message sent by the node 110, such as a sensor reading, will reach the further node 130 via the parent node 120. Thus, the message is passed on from the node 110 over a first wireless route segment 122 to the parent node 120 and from the parent node 120 over a second wireless route segment 124 to the further node 130. In this simplified example, there are two other nodes 140, 150 that can function as a parent node. The parent node 120 is selected by the node 110 based on signal strength. One of the first alternative parent node 140 and the second alternative parent node 150 can alternatively be selected as parent node instead of the parent node 120. If the first alternative parent node 140 is selected by the node 110 as parent node, then a message is routed from the node 110 over a third route segment 142 to the first alternative parent node 140 and continues over a fourth route segment 144 to the further node 130. If the second alternative parent node 150 is selected by the node 110 as parent node, then a message is routed from the node 110 over a fifth route segment 152 to the second alternative parent node 150 and continues over a sixth route segment 154 to the further node 130.

Not shown in this example are routes between node 120 and node 140 nor between node 120 and node 150. This is to simplify the example given. In a mesh network typically these routes do exist.

As a first example, the node 110 has selected the parent node 120 to relay its messages to the further node 130. The node 110 can calculate a reliability indicator indicative of the reliability of routing a message via the parent node to another node in the network, in this example to the further node 130. When the further node 130 acknowledges the receipt of messages, then the node 110 would for each, certain or some messages sent via the parent node 120 receive a reply acknowledgement message. Based on these acknowledgement messages, a reliability indicator can be calculated. For example, if for each message sent an acknowledgement message is expected, a percentage of messages sent by the node 110 that are verifiably received by the further node 130 can be calculated. When this percentage drops below, for example, 90% or when this percentage starts to go down compared to an average (e.g. on average it can be 80%, yet it drops to 60%), or when the number of messages that are not acknowledged passes a threshold (e.g. when five messages in a row, or ten messages out of the last hundred are not acknowledged), the node 110 can select another node than its parent node 120 to operate as new parent node. In this example, the node 110 can select either the first alternative parent node 140 and the second alternative parent node 150 as new parent node.

The selection criteria for selecting a new parent node can be the same as the selection criteria initially used by the node 110 to select the parent node 120, such as signal strength. The selection criteria for selecting the new parent node can exclude the parent node 120 from the nodes to select a new node as parent from. This can be conditional, for example it might be beneficial to keep the parent node 120 if there are no other nodes that can be selected or if the signal strength of other nodes that can be selected is very low. Reliability data can be stored such that when a new node is to be selected as parent node, reliability data can be taken into account in determining which node to select as new parent node. For example, when all nodes that can be selected as parent node having a signal strength above a predetermined threshold have been used and each of these nodes has low reliability, this signal strength threshold could be lowered.

Figure 2:
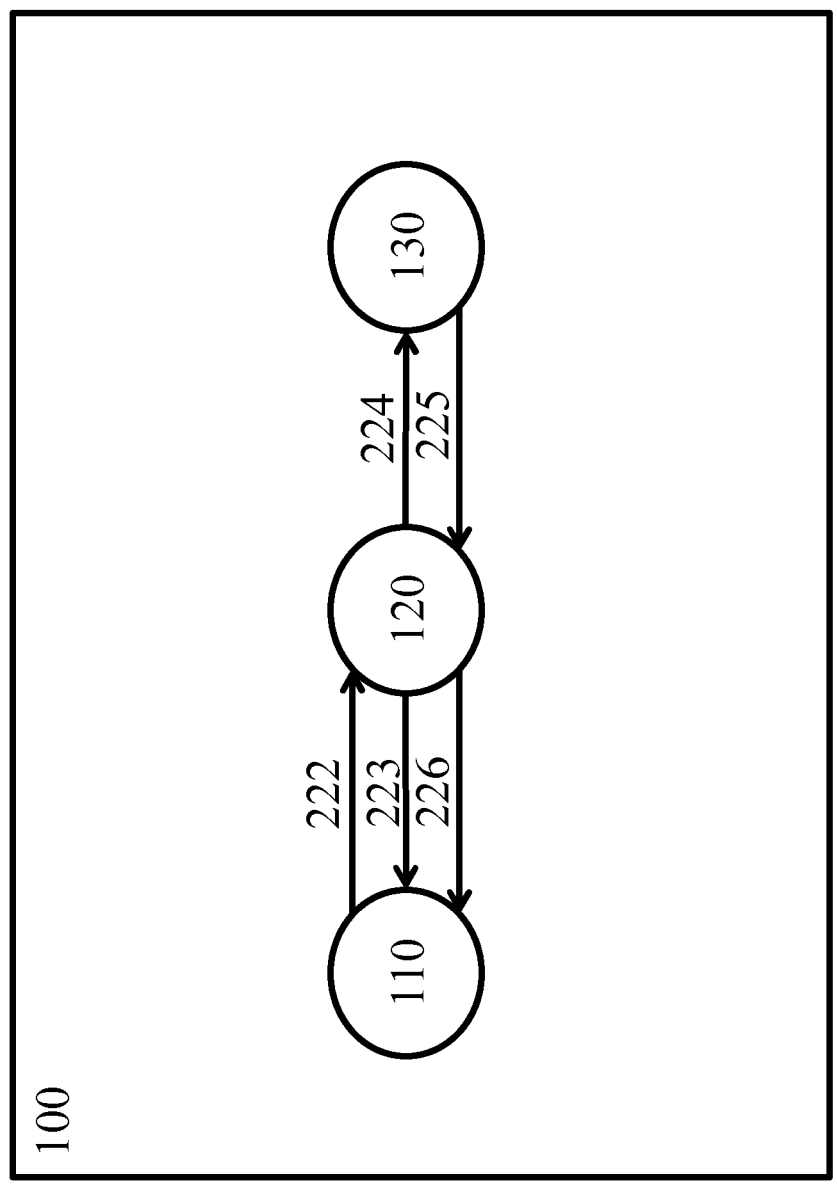
FIG. 2 shows schematically and exemplarily a message flow in the wireless mesh network of FIG. 1.

In FIG. 2 it is illustrated how in the wireless mesh network 100 of FIG. 1 the message flow is directed. The node 110 sends a message 222 destined for the further node 130 via the parent node 120. The parent node 120 may acknowledge 223 the receipt of the message 222, yet such an acknowledgement does not indicate the further node 130 having received the message. Still, the node can optionally apply a separate retransmission strategy for messages that are not acknowledged by the parent node 120. Further, the node 110 can either leave messages that are not acknowledged by the parent node 120 out of the calculation of the reliability indicator or take these into account.

The message 222 is passed on 224 to the further node 130 by the parent node 120. When the further node 130 sends an acknowledgment 225 for having received said passed on message 224, the acknowledgement 225 is held by the parent node for the node 110 to retrieve 226.

As mentioned, this is a simplified view of a wireless mesh network. Typically, there would be more nodes in the wireless mesh network and messages can be routed making use of these other nodes. General terminology is used in describing these figures, as the method can be applied to various wireless mesh networks. In particular, however, it is suitable for a wireless mesh network, such as Thread, a ZigBee (Light Link) wireless mesh or any other wireless mesh network used for e.g. a wireless lighting system.

Figure 3:
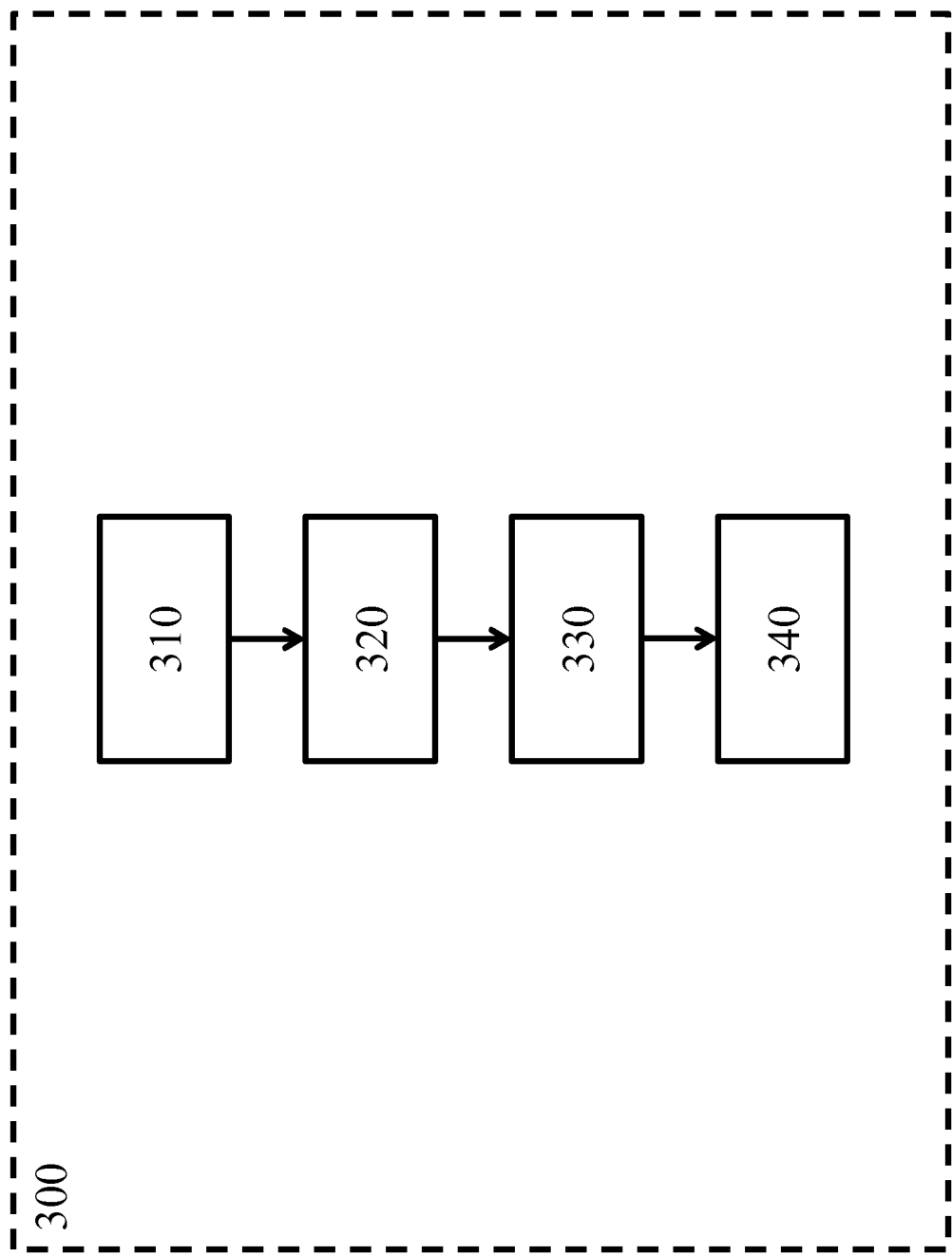
FIG. 3 shows schematically and exemplarily a method of controlling a node in a wireless mesh network.

FIG. 3 shows an embodiment of a method 300 of controlling a node in a wireless mesh network. The method comprises: selecting 310 a parent node, sending 320 messages to a further node, calculating 330 a reliability indicator and selecting 340 a new parent node. The selecting 310 of the parent node is based on first selection criteria, such as signal strength of the signal emitted by the parent node to be. The node will communicate with one or more further nodes in the wireless mesh network via the selected parent node. Typically, in a wireless mesh network, the node will send a message to the parent node which in turn will relay it to the node the message is destined for. Also, the node will poll the parent node periodically to check if there are any messages being held by the parent node for the node to retrieve.

The sending 320 of messages by the node destined for at least one of the one or more further nodes in the wireless mesh network via the selected parent node will trigger acknowledgement messages to be sent to the node by the at least one of the one or more further nodes (i.e. the node that the message is destined for acknowledged having received it). Calculating 330 a reliability indicator of the parent node can then be performed by the node by polling the parent node for (or otherwise receiving from the parent node) the number of messages for which an acknowledgement has been received from the one or more further nodes said messages were destined for. Typically, this is performed by the node receiving each individual acknowledgement the parent node has received for messages that were sent where such an acknowledgement was requested. The node can then perform, for example, the calculation of the number of messages for which an acknowledgement is missing. When the reliability indicator exceeds a predetermined threshold, such as when it drops below a percentage of messages acknowledged versus messages sent for which acknowledgement is expected, the node will start the process of selecting 340 a new parent node. This selection is done based on second selection criteria. An example of these second selection criteria is the selection of the node, capable of acting as a parent node, with the greatest signal strength (as measured by the node) however excluding the parent node with the low reliability indicator from the list of nodes to select from. The first and second selection criteria are, in an embodiment, different criteria. Although the wording first selection criteria and second selection criteria are used, this does not exclude that the first and/or second selection criteria comprise single criteria.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. The reference to first, second, third, etc. does not indicate any order or relationship. Any reference signs in the claims should not be construed as limiting the scope.

The invention claimed is:

1. A method of controlling a node in a wireless mesh network, the method comprising:
    selecting, based on a first selection criteria, a parent node through which it will communicate with one or more further nodes in the wireless mesh network, wherein the first selection criteria comprises greatest signal strength,
    sending one or more messages destined to at least one of the one or more further nodes in the wireless mesh network via the selected parent node,
    calculating a reliability indicator of the parent node by receiving from the parent node acknowledgements received from the one or more further nodes said messages were destined for,
    selecting a new parent node, based on a second selection criteria, when the reliability indicator exceeds a predetermined threshold, wherein the second selection criteria comprises next greatest signal strength, wherein the step of selecting a new parent node is conditional based on one or more of: the time passed since the last selection of a new parent node, the number of times a new parent node has been selected in a predetermined time period, and the number of nodes capable of operating as a parent node from which a new parent node can be selected,
    selecting, based on the reliability indicator, a retransmission strategy for retransmitting a message for which no acknowledgement has been received, and
    executing the retransmission strategy when a message is not acknowledged by the further node said message was destined for.

2. The method according to claim 1, wherein preference is given to selecting as the new parent node a node other than the current parent node.

3. The method according to claim 1, wherein the node is a sensor node sending messages destined for a further node operating as a collector node.

4. The method according to claim 1, wherein the retransmission strategy comprises resending messages of a first type and not resending messages of a second type.

5. The method according to claim 4, wherein messages of the first type are messages triggered by a single event and/or a periodic update and/or wherein messages of the second type are messages triggered by a burst event.

6. The method according to claim 1, wherein the retransmission strategy comprises resending a message as a unicast message via the parent node when no acknowledgement is received.

7. The method according to claim 1, wherein the message is resent as a broadcast message via the parent node when no acknowledgement is received.

8. The method according to claim 1, wherein the message is resent as a unicast or broadcast message through a further node, not being the parent node, and/or directly from the node, when no acknowledgement is received.

9. The method according to claim 1, wherein a message is resent no more than a predetermined maximum number of times.

10. A device arranged for operating as a node in a wireless mesh network, the device comprising:
- an interface arranged for communicating with the wireless mesh network,
- a processor arranged for sending and receiving messages via the interface, wherein the processor is further arranged for:
- selecting, based on a first selection criteria, a parent node through which the device will communicate with one or more further nodes in the wireless mesh network, wherein the first selection criteria comprises greatest signal strength,
- sending one or more messages destined to at least one of the one or more further nodes in the wireless mesh network via the selected parent node,
- calculating a reliability indicator of the parent node by receiving from the parent node acknowledgements for which an acknowledgement has been received from the one or more further nodes said messages were destined for,
- selecting a new parent node, based on a second selection criteria, when the reliability indicator exceeds a predetermined threshold, wherein the second selection criteria comprises next greatest signal strength, wherein the selecting the new parent node is further conditional based on one or more of: the time passed since the last selection of a new parent node, the number of times a new parent node has been selected in a predetermined time period, and the number of nodes capable of operating as a parent node from which a new parent node can be selected, and
- selecting, based on the reliability indicator, a retransmission strategy for retransmitting a message for which no acknowledgement has been received, and wherein the processor is arranged for executing the selected retransmission strategy when a message is not acknowledged by the further node said message was destined to.

* * * * *